US006495487B1

(12) United States Patent
Bogdan

(10) Patent No.: US 6,495,487 B1
(45) Date of Patent: *Dec. 17, 2002

(54) SELECTIVE BIFUNCTIONAL MULTIMETALLIC REFORMING CATALYST

(75) Inventor: Paula L. Bogdan, Mt. Prospect, IL (US)

(73) Assignee: UOP LLC, Des Plaines, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/435,272

(22) Filed: Dec. 10, 1999

Related U.S. Application Data

(63) Continuation-in-part of application No. 08/762,620, filed on Dec. 9, 1996, now Pat. No. 6,013,173.

(51) Int. Cl.$^7$ .................. B01J 27/06; B01J 27/125; B01J 27/13; B01J 27/135
(52) U.S. Cl. .................. 502/227; 502/230; 502/231; 502/234; 502/302; 502/324; 502/325; 502/349; 502/352; 502/346; 208/138; 208/139
(58) Field of Search ................ 502/227, 231, 502/230, 234, 324, 302, 325, 349, 352, 346; 208/138, 139

(56) References Cited

U.S. PATENT DOCUMENTS

| 3,915,845 A | 10/1975 | Antos .................. 208/139 |
| 3,951,868 A | 4/1976 | Wilheim |
| 4,039,477 A | 8/1977 | Engelhard et al. .......... 252/442 |
| 4,401,557 A | 8/1983 | Juguin et al. ............... 208/139 |
| 4,522,935 A | 6/1985 | Robinson et al. ........... 502/223 |
| 5,665,223 A | * 9/1997 | Bogdan .................... 208/138 |
| 6,013,173 A | * 1/2000 | Bogdan .................... 208/139 |

* cited by examiner

Primary Examiner—Elizabeth D. Wood
(74) Attorney, Agent, or Firm—John G. Tolemei; Frank S. Molinaro; Thomas K. McBride, Jr.

(57) ABSTRACT

A novel catalyst and the use thereof in a reforming process is disclosed. The catalyst comprises a refractory inorganic oxide, platinum-group metal, Group IVA(IUPAC 14) metal, indium and lanthanide-series metal. Utilization of this catalyst in the conversion of hydrocarbons, especially in reforming, results in significantly improved selectivity to the desired gasoline or aromatics product.

11 Claims, 2 Drawing Sheets

SELECTIVE BIFUNCTIONAL MULTIMETALLIC REFORMING CATALYST

This application is a continuation-in-part of prior copending application Ser. No. 08/762,620 filed Dec. 9, 1996, now issued as U.S. Pat. No. 6,013,173, the contents of which are incorporated herein by reference.

FIELD OF THE INVENTION

This invention relates to an improved catalyst for the conversion of hydrocarbons, and more specifically for the catalytic reforming of gasoline-range hydrocarbons.

BACKGROUND OF THE INVENTION

The subject of the present invention is a novel dual-function catalytic composite, characterized by a combination of three or more metals in specified concentrations on the finished catalyst, and its use in hydrocarbon conversion. Catalysts having both a hydrogenation-dehydrogenation function and a cracking function are used widely in many applications, particularly in the petroleum and petrochemical industry, to accelerate a wide spectrum of hydrocarbon-conversion reactions. The cracking function generally relates to an acid-action material of the porous, adsorptive, refractory-oxide type which is typically utilized as the support or carrier for a heavy-metal component, such as the Group VIII(IUPAC 8–10) metals, which primarily contribute the hydrogenation-dehydrogenation function. Other metals in combined or elemental form can influence one or both of the cracking and hydrogenation-dehydrogenation functions.

In another aspect, the present invention comprehends improved processes that emanate from the use of the novel catalyst. These dual-function catalysts are used to accelerate a wide variety of hydrocarbon-conversion reactions such as dehydrogenation, hydrogenation, hydrocracking, hydrogenolysis, isomerization, desulfurization, cyclization, alkylation, polymerization, cracking, and hydroisomerization. In a specific aspect, an improved reforming process utilizes the subject catalyst to increase selectivity to gasoline and aromatics products.

Catalytic reforming involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, hydrocracking of paraffins to light products boiling outside the gasoline range, dealkylation of alkylbenzenes and isomerization of paraffins. Some of the reactions occurring during reforming, such as hydrocracking which produces light paraffin gases, have a deleterious effect on the yield of products boiling in the gasoline range. Process improvements in catalytic reforming thus are targeted toward enhancing those reactions effecting a higher yield of the gasoline fraction at a given octane number.

It is of critical importance that a dual-function catalyst exhibit the capability both to initially perform its specified functions efficiently and to perform them satisfactorily for prolonged periods of time. The parameters used in the art to measure how well a particular catalyst performs its intended functions in a particular hydrocarbon reaction environment are activity, selectivity and stability. In a reforming environment, these parameters are defined as follows:

1) Activity is a measure of the ability of the catalyst to convert hydrocarbon reactants to products at a designated severity level, with severity level representing a combination of reaction conditions: temperature, pressure, contact time, and hydrogen partial pressure. Activity typically is designated as the octane number of the pentanes and heavier ("$C_5+$") product stream from a given feedstock at a given severity level, or conversely as the temperature required to achieve a given octane number.

2) Selectivity refers to the percentage yield of petrochemical aromatics or $C_5+$ gasoline product from a given feedstock at a particular activity level.

3) Stability refers to the rate of change of activity or selectivity per unit of time or of feedstock processed. Activity stability generally is measured as the rate of change of operating temperature per unit of time or of feedstock to achieve a given $C_5+$ product octane, with a lower rate of temperature change corresponding to better activity stability, since catalytic reforming units typically operate at relatively constant product octane. Selectivity stability is measured as the rate of decrease of $C_5+$ product or aromatics yield per unit of time or of feedstock.

Programs to improve performance of reforming catalysts are being stimulated by the reformulation of gasoline, following upon widespread removal of lead anti-knock additive, in order to reduce harmful vehicle emissions. Gasoline upgrading processes such as catalytic reforming must operate at higher efficiency with greater flexibility in order to meet these changing requirements. Catalyst selectivity is becoming ever more important to tailor gasoline components to these needs while avoiding losses to lower-value products. The major problem facing workers in this area of the art, therefore, is to develop more selective catalysts while maintaining effective catalyst activity and stability.

The art teaches a variety of multimetallic catalysts for the catalytic reforming of naphtha feedstocks. Most of these comprise combinations of platinum-group metals with rhenium and/or Group IVA(IUPAC 14) metals.

U.S. Pat. No. 3,951,868 (Wilhelm) teaches a catalyst comprising platinum, halogen, germanium or tin, and indium, wherein the ratio of indium to platinum-group metal is about 0.1–1:1. U.S. Pat. No. 4,522,935 (Robinson et al.) discloses a catalyst comprising a platinum-group metal, tin, indium, halogen, and a porous support which may comprise alumina. The feature of the catalyst is an atomic ratio of indium to platinum-group metal of more than 1.35, and preferably about 2.55.

U.S. Pat. No. 3,915,845 (Antos) discloses hydrocarbon conversion with a catalyst comprising a platinum-group metal, Group IVA metal, halogen and lanthanide in an atomic ratio to platinum-group metal of 0.1 to 1.25. The preferred lanthanides are lanthanum, cerium, and especially neodymium which was exemplified in Antos. U.S. Pat. No. 4,039,477 (Engelhard et al.) discloses a catalyst for the catalytic hydrotreatment of hydrocarbons comprising a refractory metal oxide, platinum-group metal, tin and at least one metal from yttrium, thorium, uranium, praseodymium, cerium, lanthanum, neodymium, samarium, dysprosium and gadolinium with favorable results being observed at relatively low ratios of the latter metals to platinum.

Another type of multimetallic catalyst has been disclosed as comprising a combination of platinum with rhodium or osmium and a third metal. U.S. Pat. No. 4,401,557 (Juguin et al.) discloses a reforming process using a catalyst comprising a carrier, platinum, a second metal of either rhodium or osmium, and a third metal from the list of chromium, tungsten, molybdenum, manganese, rhenium, gallium, indium, thallium, samarium, zinc, cadmium, titanium, and zirconium. The examples appear to show that the preferred third metals are essentially tungsten, manganese, rhenium, gallium, germanium, tin, thorium, cerium, and samarium.

SUMMARY OF THE INVENTION

It is an object of the invention to provide a novel catalyst for improved selectivity in hydrocarbon conversion. A corollary object of the invention is to provide a reforming process having improved selectivity with respect to gasoline or aromatics yields.

The invention originates from the discovery that a catalyst containing platinum, tin, indium and cerium on chlorided alumina shows a favorable ratio of aromatization to cracking in a reforming reaction.

A broad embodiment of the present invention is a catalyst comprising a refractory inorganic oxide, a platinum-group metal, a Group IVA(IUPAC 14) metal, indium and a lanthanide-series metal. The atomic ratio of the combination of indium and lanthanide metal to platinum-group metal preferably is at least about 1.5, more preferably at least about 2. The catalyst optimally also comprises a halogen, especially chlorine. In preferred embodiments the refractory inorganic oxide is alumina, the platinum-group metal is platinum, the Group IVA(IUPAC 14) metal is tin, and the lanthanide-series metal is cerium. A highly preferred catalyst consists essentially of platinum, tin, indium and cerium on a halogenated alumina support.

In another aspect, the invention is a process for the conversion of a hydrocarbon feedstock utilizing a catalyst comprising a refractory inorganic oxide, a platinum-group metal, a Group IVA(IUPAC 14) metal, indium and a lanthanide-series metal. Preferably the hydrocarbon conversion is catalytic reforming of a naphtha feedstock, utilizing the catalyst of the invention to increase the yield of gasoline and/or aromatics. The conversion optimally comprises dehydrocyclization to increase aromatics yields. In an advantageous embodiment, the naphtha feedstock comprises hydrocarbons in the $C_6$–$C_8$ range which yield one or more of benzene, toluene and xylenes in a catalytic reforming unit.

These as well as other objects and embodiments will become evident from the following more detailed description of the present invention.

DESCRIPTION OF THE PREFERRED EMBODIMENTS

Figure 1:
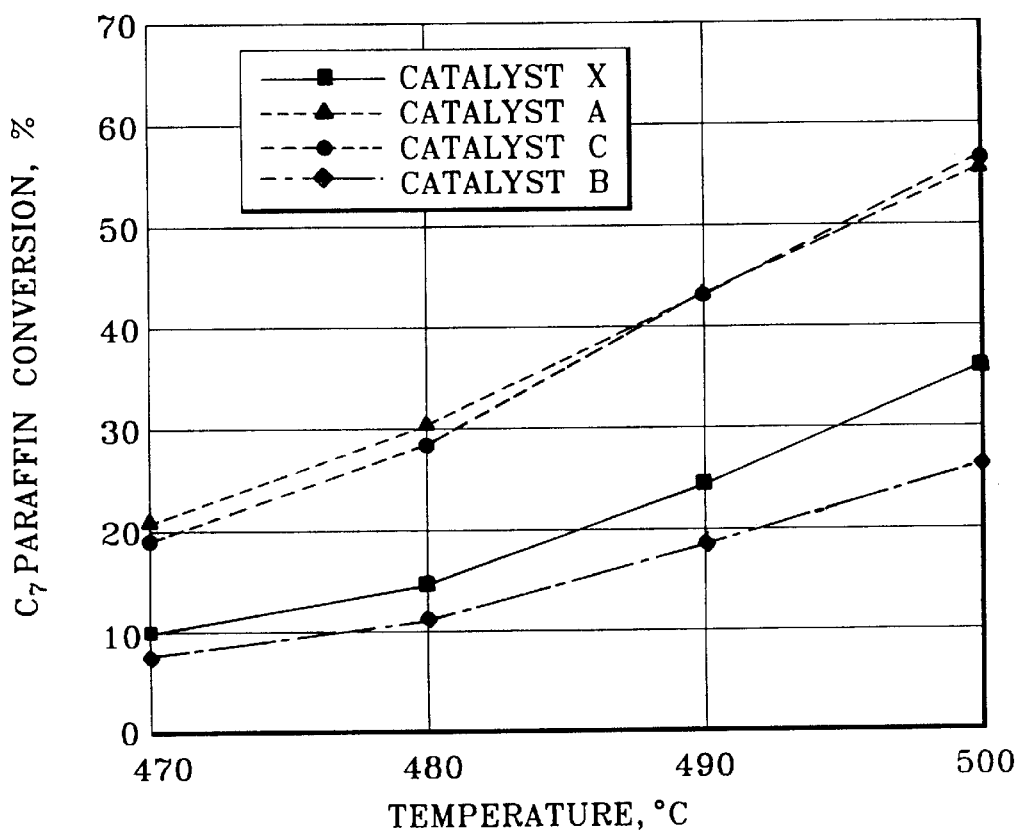
FIG. 1 shows conversion of heptanes as a function of temperature using catalysts of the prior art and of the present invention.

A broad embodiment of the present invention, therefore, is a catalyst comprising a refractory inorganic-oxide support, a platinum-group metal, at least one metal of Group IVA(IUPAC 14) of the Periodic Table [See Cotton and Wilkinson, *Advanced Inorganic Chemistry*, John Wiley & Sons (Fifth Edition, 1988)], indium, and a lanthanide-series metal, preferably in combination with a halogen.

The refractory support utilized in the present invention usually is a porous, adsorptive, high-surface area support having a surface area of about 25 to about 500 $m^2/g$. The porous carrier material should also be uniform in composition and relatively refractory to the conditions utilized in the hydrocarbon conversion process. By the terms "uniform in composition" it is meant that the support be unlayered, has no concentration gradients of the species inherent to its composition, and is completely homogeneous in composition. Thus, if the support is a mixture of two or more refractory materials, the relative amounts of these materials will be constant and uniform throughout the entire support. Included within the scope of the present invention carrier are materials which have traditionally been utilized in dual-function hydrocarbon conversion catalysts such as:

1) refractory inorganic oxides such as alumina, magnesia, titania, zirconia, chromia, zinc oxide, thoria, boria, silica-alumina, silica-magnesia, chromia-alumina, alumina-boria, silica-zirconia, etc.;
2) ceramics, porcelain, bauxite;
3) silica or silica gel, silicon carbide, clays and silicates which are synthetically prepared or naturally occurring, which may or may not be acid treated, for example attapulgus clay, diatomaceous earth, fuller's earth, kaolin, or kieselguhr;
4) crystalline zeolitic aluminosilicates, such as X-zeolite, Y-zeolite, mordenite, β-zeolite, Ω-zeolite or L-zeolite, either in hydrogen form or preferably in nonacidic form with one or more alkali metals occupying the cationic exchangeable sites;
5) non-zeolitic molecular sieves, such as aluminophosphates or silico-alumino-phosphates; and
6) combinations of two or more materials from one or more of these groups.

Preferably the refractory support comprises one or more inorganic oxides, with the preferred refractory inorganic oxide for use in the present invention being alumina. Suitable alumina materials are the crystalline aluminas known as the gamma-, eta-, and theta-alumina, with gamma- or eta-alumina giving best results. The preferred refractory inorganic oxide will have an apparent bulk density of about 0.3 to about 1.0 g/cc and surface area characteristics such that the average pore diameter is about 20 to 300 angstroms, the pore volume is about 0.1 to about 1 cc/g, and the surface area is about 100 to about 500 $m^2/g$.

Considering that alumina is the preferred refractory inorganic oxide, a particularly preferred alumina is that which has been characterized in U.S. Pat. Nos. 3,852,190 and 4,012,313 as a by-product from a Ziegler higher alcohol synthesis reaction as described in Ziegler's U.S. Pat. No. 2,892,858, hereinafter referred to as a "Ziegler alumina". Ziegler alumina is presently available from the Vista Chemical Company under the trademark "Catapal" or from Condea Chemie GmbH under the trademark "Pural," and will be available from ALCOA under the trademark "HiQ-20." This high-purity pseudoboehmite, after calcination at a high temperature, has been shown to yield a gamma-alumina of extremely high purity.

The alumina powder can be formed into any desired shape or type of carrier material known to those skilled in the art such as spheres, rods, pills, pellets, tablets, granules, extrudates, and like forms by methods well known to the practitioners of the catalyst material forming art.

The preferred form of the present catalyst support is a sphere, with a preferred diameter of between about 0.7 mm and 3.5 mm. Alumina spheres may be continuously manufactured by the well known oil-drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 150° to about 205° C. and subjected to a calcination procedure at a temperature of about 450° to about 700° C. for a period of about 1 to about 20 hours. This treatment effects conversion of the alumina hydrogel to the corresponding crystalline gamma-alumina. U.S. Pat. No. 2,620,314 provides additional details and is incorporated herein by reference thereto.

An alternative form of carrier material is a cylindrical extrudate, preferably prepared by mixing the alumina powder with water and suitable peptizing agents such as HCl until an extrudable dough is formed. The amount of water added to form the dough is typically sufficient to give a loss on ignition (LOI) at 500° C. of about 45 to 65 mass-%, with a value of 55 mass-% being preferred. The acid addition rate is generally sufficient to provide 2 to 7 mass-% of the volatile-free alumina powder used in the mix, with a value of 3 to 4 mass-% being preferred. The resulting dough is extruded through a suitably sized die to form extrudate particles. These particles are then dried at a temperature of about 260° to about 427° C. for a period of about 0.1 to 5 hours to form the extrudate particles. The preferred diameter of cylindrical extrudate particles is between about 0.7 and 3.5 mm, with a length-to-diameter ratio of between about 1:1 and 5:1.

A platinum-group metal component is an essential ingredient of the catalyst. This component comprises platinum, palladium, ruthenium, rhodium, iridium, osmium or mixtures thereof, with platinum being preferred. The platinum-group metal may exist within the final catalytic composite as a compound such as an oxide, sulfide, halide, oxyhalide, etc., in chemical combination with one or more of the other ingredients of the composite or as an elemental metal. Best results are obtained when substantially all of this component is present in the elemental state and it is homogeneously dispersed within the carrier material. This component may be present in the final catalyst composite in any amount which is catalytically effective; the platinum-group metal generally will comprise about 0.01 to about 2 mass-% of the final catalytic composite, calculated on an elemental basis. Excellent results are obtained when the catalyst contains about 0.05 to about 1 mass-% of platinum.

The platinum-group metal component may be incorporated in the porous carrier material in any suitable manner, such as coprecipitation, ion-exchange or impregnation. The preferred method of preparing the catalyst involves the utilization of a soluble, decomposable compound of platinum-group metal to impregnate the carrier material in a relatively uniform manner. For example, the component may be added to the support by commingling the latter with an aqueous solution of chloroplatinic or chloroiridic or chloropalladic acid. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diaminepalladium (II) hydroxide, tetraaminepalladium (II) chloride, hexaminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic or chloropalladic acid or rhodium trichloride hydrate, is preferred since it facilitates the incorporation of both the platinum-group-metal component and at least a minor quantity of the preferred halogen component in a single step. Hydrogen chloride or the like acid is also generally added to the impregnation solution in order to further facilitate the incorporation of the halogen component and the uniform distribution of the metallic components throughout the carrier material. In addition, it is generally preferred to impregnate the carrier material after it has been calcined in order to minimize the risk of washing away the valuable platinum-group metal.

Generally the platinum-group metal component is dispersed homogeneously in the catalyst. Dispersion of the platinum-group metal preferably is determined by Scanning Transmission Electron Microscope (STEM), comparing metals concentrations with overall catalyst metal content. In an alternative embodiment one or more platinum-group metal components may be present as a surface-layer component as described in U.S. Pat. No. 4,677,094, incorporated by reference. The "surface layer" is the layer of a catalyst particle adjacent to the surface of the particle, and the concentration of surface-layer metal tapers off in progressing from the surface to the center of the catalyst particle.

A Group IVA(IUPAC 14) metal component is another essential ingredient of the catalyst of the present invention. Of the Group IVA(IUPAC 14) metals, germanium and tin are preferred and tin is especially preferred. This component may be present as an elemental metal, as a chemical compound such as the oxide, sulfide, halide, oxychloride, etc., or as a physical or chemical combination with the porous carrier material and/or other components of the catalytic composite. Preferably, a substantial portion of the Group IVA(IUPAC 14) metal exists in the finished catalyst in an oxidation state above that of the elemental metal. The Group IVA(IUPAC 14) metal component optimally is utilized in an amount sufficient to result in a final catalytic composite containing about 0.01 to about 5 mass % metal, calculated on an elemental basis, with best results obtained at a level of about 0.1 to about 2 mass-% metal.

The Group IVA(IUPAC 14) metal component may be incorporated in the catalyst in any suitable manner to achieve a homogeneous dispersion, such as by coprecipitation with the porous carrier material, ion-exchange with the carrier material or impregnation of the carrier material at any stage in the preparation. One method of incorporating the Group IVA(IUPAC 14) metal component into the catalyst composite involves the utilization of a soluble, decomposable compound of a Group IVA(IUPAC 14) metal to impregnate and disperse the metal throughout the porous carrier material. The Group IVA(IUPAC 14) metal component can be impregnated either prior to, simultaneously with, or after the other components are added to the carrier material. Thus, the Group IVA(IUPAC 14) metal component may be added to the carrier material by commingling the latter with an aqueous solution of a suitable metal salt or soluble compound such as stannous bromide, stannous chloride, stannic chloride, stannic chloride pentahydrate; or germanium oxide, germanium tetraethoxide, germanium tetrachloride; or lead nitrate, lead acetate, lead chlorate and the like compounds. The utilization of Group IVA(IUPAC 14) metal chloride compounds, such as stannic chloride, germanium tetrachloride or lead chlorate is particularly preferred since it facilitates the incorporation of both the metal component and at least a minor amount of the preferred halogen component in a single step. When combined with hydrogen chloride during the especially preferred alumina peptization step described hereinabove, a homogeneous dispersion of the Group IVA(IUPAC 14) metal component is obtained in accordance with the present invention. In an alternative embodiment, organic metal compounds such as trimethyl tin chloride and dimethyl tin dichloride are incorporated into the catalyst during the peptization of the inorganic oxide binder, and most preferably during peptization of alumina with hydrogen chloride or nitric acid.

Indium is another essential component of the present catalyst. The indium may be present in the catalytic composite in any catalytically available form such as the elemental metal, a compound such as the oxide, hydroxide, halide, oxyhalide, aluminate, or in chemical combination with one or more of the other ingredients of the catalyst. Although not intended to so restrict the present invention, it is believed that best results are obtained when the indium is present in the composite in a form wherein substantially all of the indium moiety is in an oxidation state above that of the elemental metal such as in the form of the oxide, oxyhalide or halide or in a mixture thereof and the subsequently described oxidation and reduction steps that are preferably used in the preparation of the instant catalytic composite are specifically designed to achieve this end.

Indium can be present in the catalyst in any amount which is catalytically effective, with good results obtained with about 0.1 to about 5 mass-% indium on an elemental basis in the catalyst. Best results are ordinarily achieved with about 0.2 to about 2 mass-% indium, especially about 0.2 to 1 mass-%, calculated on an elemental basis. The preferred atomic ratio of indium to platinum-group metal for this catalyst is at least about 1.2:1, preferably about 1.5:1 or more, and optionally about 2:1 or more; in one embodiment, the ratio is between about 1.2 and 2.5. The relationship of indium to lanthanide in the present catalyst is discussed hereinbelow.

An indium component is incorporated in the catalytic composite in any suitable manner known to the art, such as by coprecipitation, cogelation or coextrusion with the porous carrier material, ion exchange with the gelled carrier material, or impregnation of the porous carrier material either after, before, or during the period when it is dried and calcined. It is intended to include within the scope of the present invention all conventional methods for incorporating and simultaneously distributing a metallic component in a catalytic composite in a desired manner, as the particular method of incorporation used is not deemed to be an essential feature of the present invention. Preferably the method used results in a relatively uniform dispersion of the indium moiety in the carrier material.

One suitable method of incorporating indium into the catalytic composite involves cogelling or coprecipitating the indium component in the form of the corresponding hydrous oxide or oxyhalide during the preparation of the preferred carrier material, alumina. This method typically involves the addition of a suitable sol-soluble or sol-dispersible indium compound such as the indium trichloride, indium oxide, and the like to the alumina hydrosol and then combining the indium-containing hydrosol with a suitable gelling agent and dropping the resulting mixture into an oil bath, etc., as explained in. detail hereinbefore. Alternatively, the indium compound can be added to the gelling agent. After drying and calcining the resulting gelled carrier material in air, an intimate combination of alumina and indium oxide and/or oxychloride is obtained.

Another effective method of incorporating the indium into the catalytic composite involves utilization of a soluble, decomposable compound of indium in solution to impregnate the porous carrier material. In general, the solvent used in this impregnation step is selected on the basis of the capability to dissolve the desired indium compound and to hold it in solution until it is evenly distributed throughout the carrier material without adversely affecting the carrier material or the other ingredients of the catalyst. Suitable solvents comprise alcohols, ethers, acids, and the like, with an aqueous, acidic solution being preferred. Thus, the indium component may be added to the carrier material by commingling the carrier with an aqueous acidic solution of suitable indium salt, complex, or compound such as a nitrate, chloride, fluoride, organic alkyl, hydroxide, oxide, and the like compounds. Suitable acids for use in the impregnation solution are: inorganic acids such as hydrochloric acid, nitric acid, and the like, and strongly acidic organic acids such as oxalic acid, malonic acid, citric acid, and the like. The indium component can be impregnated into the carrier either prior to, simultaneously with, or after the platinum-group metal component.

A lanthanide-series metal is another essential component of the present catalyst. Included in the lanthanide series are lanthanum, cerium, praseodymium, neodymium, promethium, samarium, europium, gadolinium, terbium, dysprosium, holmium, erbium, thulium, ytterbium and lutetium; a cerium component is preferred. The lanthanide component may in general be present in the catalytic composite in any catalytically available form such as the elemental metal, a compound such as the oxide, hydroxide, halide, oxyhalide, aluminate, or in chemical combination with one or more of the other ingredients of the catalyst. Although not intended to so restrict the present invention, it is believed that best results are obtained when the lanthanide component is present in the composite in a form wherein substantially all of the lanthanide moiety is in an oxidation state above that of the elemental metal such as in the form of the oxide, oxyhalide or halide or in a mixture thereof and the subsequently described oxidation and reduction steps that are preferably used in the preparation of the instant catalytic composite are specifically designed to achieve this end.

The lanthanide-metal component is incorporated into the catalyst in any amount which is catalytically effective, with good results obtained with about 0.05 to about 5 mass-% lanthanide on an elemental basis in the catalyst. Best results are ordinarily achieved with about 0.2 to about 2 mass-% lanthanide, calculated on an elemental basis. The preferred atomic ratio of lanthanide to platinum-group metal for this catalyst is at least about 1.3:1, preferably about 1.5:1 or more, and especially from about 2:1 to about 5:1. The relationship of lanthanide to indium in the present catalyst is discussed hereinbelow.

The lanthanide component is incorporated in the catalytic composite in any suitable manner known to the art, such as by coprecipitation, cogelation or coextrusion with the porous carrier material, ion exchange with the gelled carrier material, or impregnation of the porous carrier material either after, before, or during the period when it is dried and calcined. It is intended to include within the scope of the present invention all conventional methods for incorporating and simultaneously distributing a metallic component in a catalytic composite in a desired manner, as the particular method of incorporation used is not deemed to be an essential feature of the present invention. Preferably the method used results in a relatively uniform dispersion of the lanthanide moiety in the carrier material, although methods which result in non-uniform lanthanide distribution are within the scope of the present invention.

One suitable method of incorporating the lanthanide component into the catalytic composite involves cogelling or coprecipitating the lanthanide component in the form of the corresponding hydrous oxide or oxyhalide during the preparation of the preferred carrier material, alumina. This method typically involves the addition of a suitable sol-soluble or sol-dispersible lanthanide compound such as the lanthanide trichloride, lanthanide oxide, and the like to the alumina hydrosol and then combining the lanthanide-containing hydrosol with a suitable gelling agent and dropping the resulting mixture into an oil bath, etc., as explained in detail hereinbefore. Alternatively, the lanthanide compound can be added to the gelling agent. After drying and calcining the resulting gelled carrier material in air, an intimate combination of alumina and lanthanide oxide and/or oxychloride is obtained.

One preferred method of incorporating the lanthanide-series metal component into the catalytic composite involves utilization of a soluble, decomposable compound of lanthanide in solution to impregnate the porous carrier material. In general, the solvent used in this impregnation step is selected on the basis of the capability to dissolve the desired lanthanide compound and to hold it in solution until it is evenly distributed throughout the carrier material without adversely affecting the carrier material or the other ingredients of the catalyst. Suitable solvents comprise alcohols, ethers, acids, and the like, with an aqueous, acidic solution being preferred. Thus, the lanthanide component may be added to the carrier material by commingling the carrier with an aqueous acidic solution of suitable lanthanide salt, complex, or compound such as a nitrate, chloride, fluoride, organic alkyl, hydroxide, oxide, and the like compounds. Suitable acids for use in the impregnation solution are: inorganic acids such as hydrochloric acid, nitric acid, and the like, and strongly acidic organic acids such as oxalic acid, malonic acid, citric acid, and the like. The lanthanide component can be impregnated into the carrier either prior to, simultaneously with, or after the platinum-group metal component.

As an alternative to a uniform distribution of one or more of the above metals in the carrier, a surface-layer metal may be incorporated into the catalyst particle in any manner suitable to effect a decreasing gradient of the metal from the surface to the center of the particle. Preferably, the metal is impregnated into the support as a compound which decomposes upon contact with the carrier, releasing the metal at or near the surface of the particle. Other means, which do not limit the invention, include using a compound of the metal which complexes with the carrier or which does not penetrate into the interior of the particle. An example is a multi-dentated ligand, such as carboxylic acids or metal compounds containing amino groups, thiol groups, phosphorus groups or other polar groups which can bond strongly to an oxide support. Alternatively, the metal may be incorporated into the catalyst by spray impregnation.

Optionally, the catalyst may also contain other components or mixtures thereof which act alone or in concert as catalyst modifiers to improve activity, selectivity or stability. Some known catalyst modifiers include rhenium, cobalt, nickel, iron, tungsten, molybdenum, chromium, bismuth, antimony, zinc, cadmium and copper. Catalytically effective amounts of these components may be added in any suitable manner to the carrier material during or after its preparation or to the catalytic composite before, while or after other components are being incorporated.

Preferably, however, a metal component of the catalyst consists essentially of a platinum-group metal, a Group IVA(IUPAC 14) metal, indium and a lanthanide-series metal, and more preferably of platinum, tin, indium and cerium. The indium and lanthanide-series metal are to some extent interchangeable, approximately on an atomic basis, with the atomic ratio of indium to lanthanide being within the range of from about 1:20 to 10:1, respectively. The ratio of the total of (indium+lanthanide-series metal) to platinum-group metal is at least about 1.5, preferably about 2 or more, and more preferably at least about 3 on an atomic basis.

An optional component of the catalyst, useful in hydrocarbon conversion embodiments of the present invention comprising dehydrogenation, dehydrocyclization, or hydrogenation reactions, is an alkali or alkaline-earth metal component. More precisely, this optional ingredient is selected from the group consisting of the compounds of the alkali metals—cesium, rubidium, potassium, sodium, and lithium—and the compounds of the alkaline earth metals—calcium, strontium, barium, and magnesium. Generally, good results are obtained in these embodiments when this component constitutes about 0.01 to about 5 mass-% of the composite, calculated on an elemental basis. This optional alkali or alkaline earth metal component can be incorporated into the composite in any of the known ways with impregnation with an aqueous solution of a suitable water-soluble, decomposable compound being preferred.

As heretofore indicated, it is necessary to employ at least one oxidation step in the preparation of the catalyst. The conditions employed to effect the oxidation step are selected to convert substantially all of the metallic components within the catalytic composite to their corresponding oxide form. The oxidation step typically takes place at a temperature of from about 370° to about 650° C. An oxygen atmosphere is employed typically comprising air. Generally, the oxidation step will be carried out for a period of from about 0.5 to about 10 hours or more, the exact period of time being that required to convert substantially all of the metallic components to their corresponding oxide form. This time will, of course, vary with the oxidation temperature employed and the oxygen content of the atmosphere employed.

In addition to the oxidation step, a halogen adjustment step may also be employed in preparing the catalyst. As heretofore indicated, the halogen adjustment step may serve a dual function. First, the halogen adjustment step may aid in homogeneous dispersion of the Group IVA(IUPAC 14) metal and other metal component. Additionally, the halogen adjustment step can serve as a means of incorporating the desired level of halogen into the final catalytic composite. The halogen adjustment step employs a halogen or halogen-containing compound in air or an oxygen atmosphere. Since the preferred halogen for incorporation into the catalytic composite comprises chlorine, the preferred halogen or halogen-containing compound utilized during the halogen adjustment step is chlorine, HCl or precursor of these compounds. In carrying out the halogen adjustment step, the catalytic composite is contacted with the halogen or halogen-containing compound in air or an oxygen atmosphere at an elevated temperature of from about 370° to about 650° C. It is further desired to have water present during the contacting step in order to aid in the adjustment. In particular, when the halogen component of the catalyst comprises chlorine, it is preferred to use a mole ratio of water to HCl of about 5:1 to about 100:1. The duration of the halogenation step is typically from about 0.5 to about 5 hours or more. Because of the similarity of conditions, the halogen adjustment step may take place during the oxidation step. Alternatively, the halogen adjustment step may be performed before or after the oxidation step as required by the particular method being employed to prepare the catalyst of the invention. Irrespective of the exact halogen adjustment step employed, the halogen content of the final catalyst should be such that there is sufficient halogen to comprise, on an elemental basis, from about 0.1 to about 10 mass-% of the finished composite.

In preparing the catalyst, it is also necessary to employ a reduction step. The reduction step is designed to reduce substantially all of the platinum-group metal component to the corresponding elemental metallic state and to ensure a relatively uniform and finely divided dispersion of this component throughout the refractory inorganic oxide. It is preferred that the reduction step take place in a substantially water-free environment. Preferably, the reducing gas is substantially pure, dry hydrogen (i.e., less than 20 volume ppm water). However, other reducing gases may be employed such as CO, nitrogen, etc. Typically, the reducing gas is contacted with the oxidized catalytic composite at conditions including a reduction temperature of from about 315° to about 650° C. for a period of time of from about 0.5 to 10 or more hours effective to reduce substantially all of the platinum-group metal component to the elemental metallic state.

The reduction step may be performed prior to loading the catalytic composite into the hydrocarbon conversion zone or it may be performed in situ as part of a hydrocarbon conversion process start-up procedure. However, if this latter technique is employed, proper precautions must be taken to predry the conversion unit to a substantially water-free state, and a substantially water-free reducing gas should be employed.

Optionally, the catalytic composite may be subjected to a presulfiding step. The optional sulfur component may be incorporated into the catalyst by any known technique.

The catalyst of the present invention has particular utility as a hydrocarbon conversion catalyst. The hydrocarbon which is to be converted is contacted with the catalyst at hydrocarbon-conversion conditions, which include a temperature of from 40° to 300° C., a pressure of from atmospheric to 200 atmospheres absolute and liquid hourly space velocities from about 0.1 to 100 $hr^{-1}$. The catalyst is particularly suitable for catalytic reforming of gasoline-range feedstocks, and also may be used for, inter alia, dehydrocyclization, isomerization of aliphatics and aromatics, dehydrogenation, hydrocracking, disproportionation, dealkylation, alkylation, transalkylation, and oligomerization.

In the preferred catalytic reforming embodiment, hydrocarbon feedstock and a hydrogen-rich gas are preheated and charged to a reforming zone containing typically two to five reactors in series. Suitable heating means are provided between reactors to compensate for the net endothermic heat of reaction in each of the reactors. Reactants may contact the catalyst in individual reactors in either upflow, downflow, or radial flow fashion, with the radial flow mode being preferred. The catalyst is contained in a fixed-bed system or, preferably, in a moving-bed system with associated continuous catalyst regeneration. Alternative approaches to reactivation of deactivated catalyst are well known to those skilled in the art, and include semi-regenerative operation in which the entire unit is shut down for catalyst regeneration and reactivation or swing-reactor operation in which an individual reactor is isolated from the system, regenerated and reactivated while the other reactors remain on-stream. The preferred continuous catalyst regeneration in conjunction with a moving-bed system is disclosed, inter alia, in U.S. Pat. Nos. 3,647,680; 3,652,231; 3,692,496; and 4,832,291, all of which are incorporated herein by reference.

Effluent from the reforming zone is passed through a cooling means to a separation zone, typically maintained at about 0° to 65° C., wherein a hydrogen-rich gas is separated from a liquid stream commonly called "unstabilized reformate". The resultant hydrogen stream can then be recycled through suitable compressing means back to the reforming zone. The liquid phase from the separation zone is typically withdrawn and processed in a fractionating system in order to adjust the butane concentration, thereby controlling front-end volatility of the resulting reformate.

Reforming conditions applied in the reforming process of the present invention include a pressure selected within the range of about 100 kPa to 7 MPa (abs). Particularly good results are obtained at low pressure, namely a pressure of about 350 to 2500 kPa (abs). Reforming temperature is in the range from about 315° to 600° C., and preferably from about 425° to 565° C. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Sufficient hydrogen is supplied to provide an amount of about 1 to about 20 moles of hydrogen per mole of hydrocarbon feed entering the reforming zone, with excellent results being obtained when about 2 to about 10 moles of hydrogen are used per mole of hydrocarbon feed. Likewise, the liquid hourly space velocity (LHSV) used in reforming is selected from the range of about 0.1 to about 20 $hr^{-1}$, with a value in the range of about 1 to about 5 $hr^{-1}$ being preferred.

The hydrocarbon feedstock that is charged to this reforming system preferably is a naphtha feedstock comprising naphthenes and paraffins that boil within the gasoline range. The preferred feedstocks are naphthas consisting principally of naphthenes and paraffins, although, in many cases, aromatics also will be present. This preferred class includes straight-run gasolines, natural gasolines, synthetic gasolines, and the like. As an alternative embodiment, it is frequently advantageous to charge thermally or catalytically cracked gasolines, partially reformed naphthas, or dehydrogenated naphthas. Mixtures of straight-run and cracked gasoline-range naphthas can also be used to advantage. The gasoline-range naphtha charge stock may be a full-boiling gasoline having an initial ASTM D-86 boiling point of from about 40–80° C. and an end boiling point within the range of from about 160–220° C., or may be a selected fraction thereof which generally will be a higher-boiling fraction commonly referred to as a heavy naphtha—for example, a naphtha boiling in the range of 100–200° C. If the reforming is directed to production of one or more of benzene, toluene and xylenes, the boiling range may be principally or substantially within the range of 60–150° C. In some cases, it is also advantageous to process pure hydrocarbons or mixtures of hydrocarbons that have been recovered from extraction units—for example, raffinates from aromatics extraction or straight-chain paraffins—which are to be converted to aromatics.

It is generally preferred to utilize the present invention in a substantially water-free environment. Essential to the achievement of this condition in the reforming zone is the control of the water level present in the.feedstock and the hydrogen stream which is being charged to the zone. Best results are ordinarily obtained when the total amount of water. entering the conversion zone from any source is held to a level less than 50 ppm and preferably less than 20 ppm, expressed as weight of equivalent water in the feedstock. In general, this can be accomplished by careful control of the water present in the feedstock and in the hydrogen stream. The feedstock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium, and the like adsorbents. Similarly, the water content of the feedstock may be adjusted by suitable stripping operations in a fractionation column or like device. In some cases, a combination of adsorbent drying and distillation drying may be used advantageously to effect almost complete removal of water from the feedstock. Preferably, the feedstock is dried to a level corresponding to less than 20 ppm of $H_2O$ equivalent.

It is preferred to maintain the water content of the hydrogen stream entering the hydrocarbon conversion zone. at a level of about 10 to about 20 volume ppm or less. In the cases where the water content of the hydrogen stream is above this range, this can be conveniently accomplished by contacting the hydrogen stream with a suitable desiccant such as those mentioned above at conventional drying conditions.

It is a preferred practice to use the present invention in a substantially sulfur-free environment. Any control means known in the art may be used to treat the naphtha feedstock which is to be charged to the reforming reaction zone. For example, the feedstock may be subjected to adsorption processes, catalytic processes, or combinations thereof. Adsorption processes may employ molecular sieves, high surface area silica-aluminas, carbon molecular sieves, crystalline aluminosilicates, activated carbons, high surface area metallic containing compositions, such as nickel or copper and the like. It is preferred that these feedstocks be treated by conventional catalytic pre-treatment methods such as hydrorefining, hydrotreating, hydrodesulfurization, etc., to remove substantially all sulfurous, nitrogenous and water-yielding contaminants therefrom, and to saturate any olefins that may be contained therein. Catalytic processes may employ traditional sulfur reducing catalyst formulations known to the art including refractory inorganic oxide supports containing metals selected from the group comprising Group VI-B(6), Group II-B(12), and Group VIII(IUPAC 8–10) of the Periodic Table.

One embodiment of the invention involves the process of converting a naphtha feedstock at catalytic dehydrocyclization conditions. In particular, the preferred naphtha feedstock comprises $C_6$–$C_8$ non-aromatic hydrocarbons. Dehydrocyclization conditions include a pressure of from about 100 kPa to 4 MPa (abs), with the preferred pressure being from about 200 kPa to 1.5 MPa, a temperature of from about 350° to 650° C., and a liquid hourly space velocity of from about 0.1 to about 10 $hr^{-1}$. Preferably, hydrogen may be employed as a diluent. When present, hydrogen may be circulated at a rate of from about 0.2 to about 10 moles of hydrogen per mole of feedstock hydrocarbon. It is preferred that the naphtha feedstock of the alternative dehydrocyclization process embodiment comprises a high proportion of paraffins, as the purpose of a dehydrocyclization process is to convert paraffins to aromatics. Because of the high value of $C_6$–$C_8$ aromatics, it is additionally preferred that the naphtha feedstock comprise $C_6$–$C_8$ paraffins. However, notwithstanding this preference, the naphtha feedstock may comprise naphthenes, aromatics, and olefins in addition to $C_6$–$C_8$ paraffins.

EXAMPLES

The following examples are presented to elucidate the catalyst and process of the present invention, demonstrating selectivity advantages over prior-art technology. These examples are offered as illustrative embodiments and should not be interpreted as limiting the claims.

The feedstock used in all but Example VI of the tests of reforming-catalyst performance consisted essentially of 90 mass-% normal heptane (n-heptane) and 10 mass-% orthoxylene. Example VI used an alternative naphtha feedstock described in that section below.

Example I

Two spherical catalysts of the prior art comprising platinum, tin and indium on alumina were prepared by conventional techniques as controls relative to the invention. Tin was incorporated into alumina sol according to the prior art, and the tin-containing alumina sol was oil-dropped to form 1.6 mm spheres which were steamed to dryness at about 10% LOI and calcined at 650° C. The spherical supports then were co-impregnated with indium chloride and chloroplatinic acid in 3% HCl. The impregnated catalysts were dried and oxychlorinated at 525° C. with 2M HCl in air and reduced with pure hydrogen at 565° C.

The finished controls were designated respectively Catalysts A, B, and D, and each contained about 1.3 mass-% chloride and had the following approximate metals contents as mass-% of the elemental metal:

| Catalyst: | A | B | D |
|---|---|---|---|
| Platinum | 0.38 | 0.36 | 0.29 |
| Tin | 0.3 | 0.3 | 0.3 |
| Indium | 0.39 | 1.14 | 0.56 |

Example II

A spherical catalyst comprising platinum, tin and cerium on alumina was prepared as a control relative to the invention. Tin was incorporated into a spherical alumina support according to the prior art as described in Example I. The spherical support then was impregnated with cerium nitrate in 3.5% nitric acid at a solution-to-support ratio of 1:1. The resulting composite was steamed to dryness (~10% LOI) and calcined at 650° C. with 3% steam. The resulting calcined composite was impregnated with chloroplatinic acid in HCl to provide 0.38 mass-% Pt in the finished catalyst. The impregnated catalyst was dried and oxychlorinated at 525° C. with 2M HCl in air and reduced with pure $H_2$ at 565° C. The finished Ce-containing catalyst was designated as Catalyst C, contained about 1.4 mass-% chloride and had the following approximate metals contents as mass-% of the elemental metal:

| | |
|---|---|
| Platinum | 0.37 |
| Tin | 0.3 |
| Cerium | 0.96 |

Example III

A spherical catalyst comprising platinum, tin, indium and cerium on alumina was prepared to demonstrate the features of the invention. Tin was incorporated into a spherical alumina support according to the prior art as described in Example I. The spherical support then was co-impregnated with indium chloride, cerium nitrate and chloroplatinic acid in 3% HCl. The impregnated catalyst was dried and oxychlorinated at 525° C. with 2M HCl in air and reduced with pure $H_2$ at 565° C. The finished In- and Ce-containing catalyst was designated as Catalyst X, contained about 1.4 mass-% chloride and had the following approximate metals contents as mass-% of the elemental metal:

| | |
|---|---|
| Platinum | 0.37 |
| Tin | 0.3 |
| Indium | 0.40 |
| Cerium | 1.00 |

Example IV

Pilot plant tests were structured to compare the selectivity and activity of control Catalysts A, B and C with that of Catalyst X of the invention for the catalytic reforming of a feedstock as described hereinabove.

Each test was based on reforming conditions comprising a pressure of 0.8 MPa (abs), a mass hourly space velocity of 3 hr$^{-1}$, and a hydrogen/hydrocarbon ratio of 8. A range of conversion was studied by varying temperature to provide several data points each at 470° C., 480° C., 490° C., and 500° C.

Conversion of heptanes over the four catalysts is compared in FIG. 1 as a function of the above range of temperatures. Catalyst X of the invention demonstrated conversions intermediate between the high-indium and the low-indium and cerium-containing control catalysts.

Figure 2:
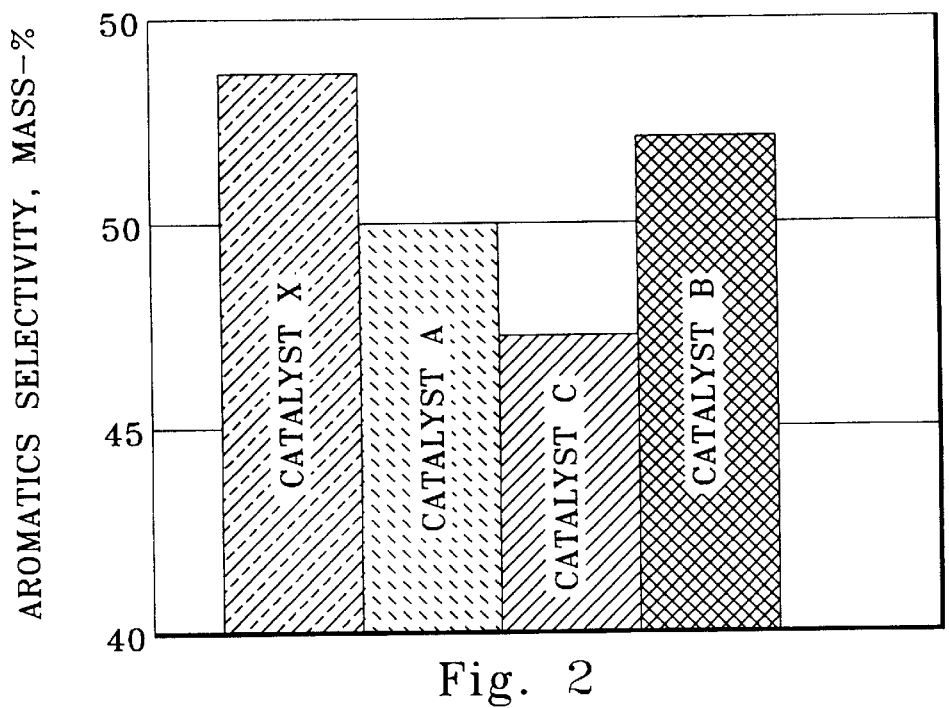
FIG. 2 compares selectivity to aromatics for catalysts of the prior art and of the present invention when processing a heptane+xylene feedstock.

FIG. 2 shows mass-% selectivity to aromatics based on 25% heptanes conversion. Catalyst X of the invention demonstrated about 1½% higher selectivity to aromatics than the best of the control catalysts.

Thus, the catalyst of the invention combines higher activity than high-indium catalyst of the art with the highest selectivity of any of the catalysts tested.

Example V

A spherical catalyst comprising platinum, germanium, indium and lanthanum on alumina was prepared to demonstrate another aspect of the features of the invention. A spherical alumina support was co-impregnated with indium chloride, lanthanum nitrate, germanium chloride and chloroplatinic acid in 3% HCl. The impregnated catalyst was dried and oxychlorinated at 525° C. with 2M HCl in air and reduced with pure $H_2$ at 565° C. The finished Ge-, In-, and La-containing catalyst was designated as Catalyst Y, contained about 1.3 mass-% chloride and had the following approximate metals contents as mass-% of the elemental metal:

| | |
|---|---|
| Platinum | 0.28 |
| Germanium | 0.23 |
| Indium | 0.39 |
| Lanthanum | 0.95 |

Example VI

Additional pilot plant tests were structured to compare the selectivity and activity of control Catalyst D with that of Catalyst Y of the invention for the catalytic reforming of a hydrotreated petroleum-derived naphtha derived from a paraffinic mid-continent crude oil which had the following characteristics:

| | |
|---|---|
| Specific Gravity | 0.737 |
| Distillation, ASTM D-86, ° C. | |
| IBP | 84 |
| 10% | 102 |
| 50% | 121 |
| 90% | 144 |
| EP | 164 |
| Mass % paraffins | 57 |
| naphthenes | 29 |
| aromatics | 14 |

Each test was based on reforming conditions comprising a pressure of 0.8 MPa (abs), a mass hourly space velocity of 2 hr$^{-1}$, and a hydrogen/hydrocarbon ratio of 3.3. A range of conversion was studied by varying temperature to provide several data points each at 490° C., 500° C., 510° C., and 520° C.

Figure 3:
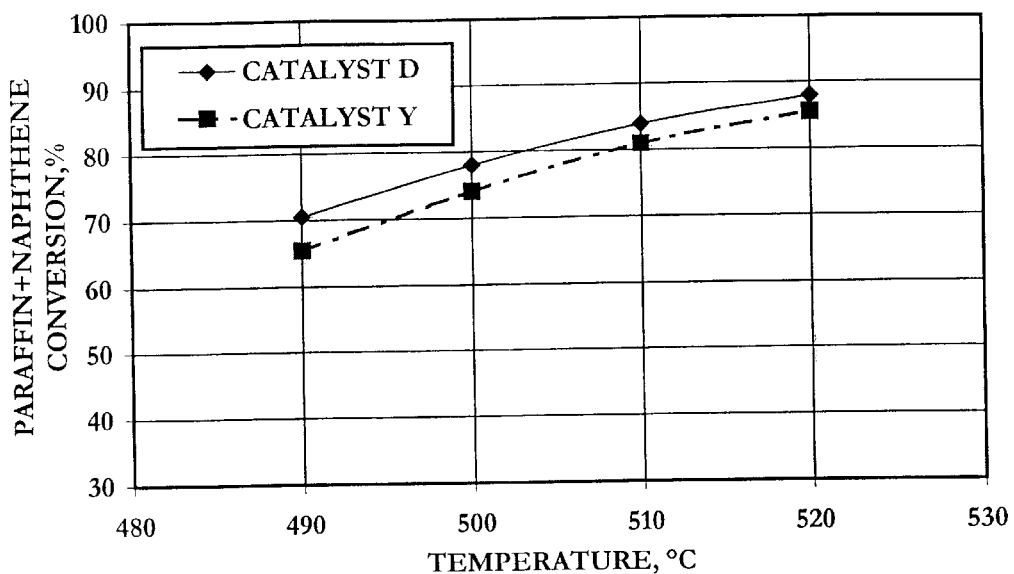
FIG. 3 shows conversion of paraffin plus naphthene as a function of temperature using a catalyst of the prior art and of the present invention when processing a naphtha feedstock.

Conversion over the two catalysts is compared in FIG. 3 as a function of the above range of temperatures. Catalyst Y of the invention demonstrated conversions similar to the control catalyst D.

Figure 4:
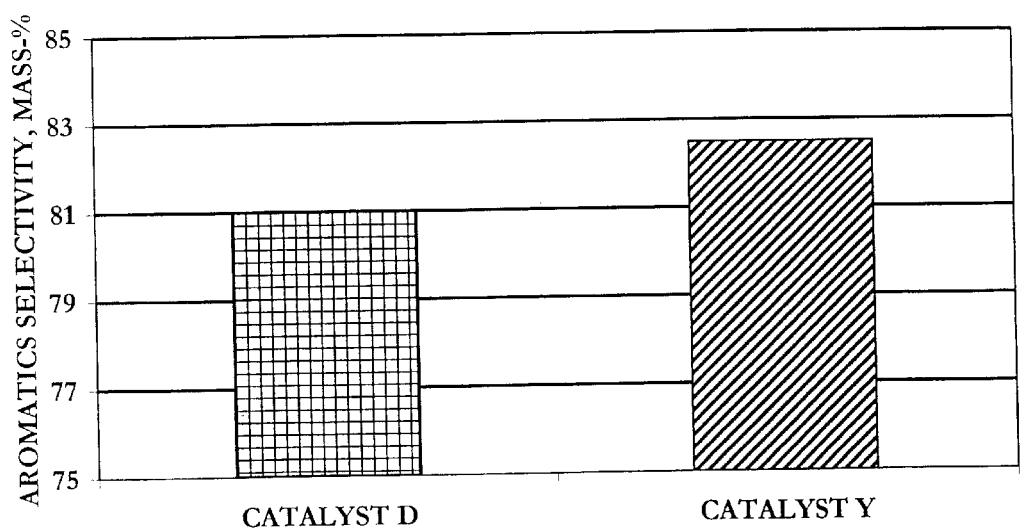
FIG. 4 compares selectivity to aromatics for a catalyst of the prior art and of the present invention when processing a naphtha feedstock.

FIG. 4 shows mass-% selectivity to aromatics based on about 82% paraffin+naphthene conversion. Catalyst Y of the invention demonstrated about 1½% higher selectivity to aromatics the control catalyst, which indicated that the alternate embodiment of the invention performed similarly to Catalyst X in displaying improved selectivity for the conversion of naphtha feedstock.

I claim as my invention:

1. A catalytic composite having enhanced conversion of paraffins to aromatics during reforming of a naphtha feedstock consisting essentially of a combination of a refractory inorganic oxide support with from about 0.1 to 10 mass-% on an elemental basis of a halogen component, about 0.01 to 2 mass-% on an elemental basis of a platinum component, about 0.01 to 5 mass-% on an elemental basis of a Group IVA (IUPAC 14) metal component selected from the group consisting of tin and germanium, about 0.1 to 5 mass-% on an elemental basis of an indium component and about 0.05 to 5 mass-% on an elemental basis of a lanthanide-series metal component selected from the group consisting of cerium and lanthanum.

2. The catalytic composite of claim 1 wherein the refractory inorganic oxide is alumina.

3. The catalytic composite of claim 1 wherein the Group IVA(IUPAC 14) metal component is a tin component.

4. The catalytic composite of claim 1 wherein the Group IVA(IUPAC 14) metal component is a germanium component.

5. The catalytic composite of claim 1 wherein the lanthanide-series metal component is a lanthanum component.

6. The catalytic composite of claim 1 wherein the lanthanide-series metal component is a cerium component.

7. The catalytic composite of claim 1 wherein the atomic ratio of lanthanide-series metal to platinum metal is at least about 1.3.

8. The catalytic composite of claim 1 wherein the atomic ratio of (indium+lanthanide-series metal) to platinum metal is at least about 1.5.

9. The catalytic composite of claim 1 wherein the atomic ratio of indium to lanthanide-series metal is within the range of from about 1:20 to 10:1.

10. The catalytic composite of claim 1 wherein the halogen component is a chlorine component.

11. A catalytic composite comprising a combination of a halogenated alumina support with a metal component consisting essentially of about 0.01 to 2 mass-% on an elemental basis of a platinum component, about 0.01 to 5 mass-% on an elemental basis of a germanium component, about 0.1 to 5 mass-% on an elemental basis of an indium component and about 0.05 to 5 mass-% on an elemental basis of a lanthanum component.

* * * * *